(12) United States Patent
Terreri

(10) Patent No.: US 10,001,659 B2
(45) Date of Patent: Jun. 19, 2018

(54) EYEGLASS RETENTION DEVICE

(71) Applicant: Steven Terreri, Guilford, CT (US)

(72) Inventor: Steven Terreri, Guilford, CT (US)

(73) Assignee: Nobadeer Solutions, LLC, Guilford, CT (US)

( * ) Notice: Subject to any disclaimer, the term of this patent is extended or adjusted under 35 U.S.C. 154(b) by 146 days.

(21) Appl. No.: 14/747,928

(22) Filed: Jun. 23, 2015

(65) Prior Publication Data

US 2015/0370087 A1 Dec. 24, 2015

Related U.S. Application Data

(63) Continuation-in-part of application No. 14/267,979, filed on May 2, 2014, now Pat. No. 9,285,605.

(51) Int. Cl.
*G02C 3/02* (2006.01)
*G02C 3/00* (2006.01)

(52) U.S. Cl.
CPC ............. *G02C 3/006* (2013.01); *G02C 3/003* (2013.01); *G02C 2200/02* (2013.01); *G02C 2200/16* (2013.01)

(58) Field of Classification Search
CPC ........... G02C 3/006; G02C 3/02; G02C 3/003
USPC .......................... 351/155, 156, 157; D16/339
See application file for complete search history.

(56) References Cited

U.S. PATENT DOCUMENTS

| | | | |
|---|---|---|---|
| 4,133,604 A | 1/1979 | Fuller | |
| 4,793,702 A | 12/1988 | Ahrens et al. | |
| 4,820,036 A | 4/1989 | Seet | |
| 5,004,334 A | 4/1991 | Miele | |
| 5,384,605 A | 1/1995 | Escobosa | |
| 5,507,075 A * | 4/1996 | Tillstrom | G02C 3/006 24/3.3 |
| 5,575,042 A | 11/1996 | Kalbach | |
| 6,520,635 B1 | 2/2003 | Ignatowski | |
| 6,764,177 B1 * | 7/2004 | Chisolm | G02C 3/006 351/156 |
| 6,899,423 B1 * | 5/2005 | Brazell | G02C 3/003 351/156 |
| 7,467,867 B1 | 12/2008 | Williams | |
| 7,780,289 B2 * | 8/2010 | Pettingill | G02C 11/02 351/156 |
| 7,896,492 B2 | 3/2011 | Pettingill | |
| 8,272,076 B2 * | 9/2012 | Tobey | A63B 33/002 2/452 |
| D669,115 S * | 10/2012 | Kalbach | D16/339 |
| 8,277,046 B2 | 10/2012 | Bond et al. | |
| 8,317,319 B2 | 11/2012 | Hellberg et al. | |
| 8,366,268 B2 | 2/2013 | Willaims | |
| 8,684,519 B2 | 4/2014 | Coleman | |
| D713,445 S | 9/2014 | Berning et al. | |

(Continued)

*Primary Examiner* — Robert E Tallman

(74) *Attorney, Agent, or Firm* — Wiggin and Dana LLP; Gregory S. Rosenblatt; Jonathan D. Hall

(57) ABSTRACT

Disclosed is an eyeglass retention apparatus including a first retention band having disposed at each of a first and second ends a retention device configured to be affixed to an eyeglass temple, and a second retention band having disposed at each of a first and second ends a retention device configured to be affixed to an eyeglass temple. The first and second retention bands are interconnected and the retention devices are together configured to secure a first and second pair of eyeglasses to a user's body.

6 Claims, 17 Drawing Sheets

(56) References Cited

U.S. PATENT DOCUMENTS

2002/0125147 A1* 9/2002 Mitchell ................ A45C 11/04
  206/5
2015/0074954 A1* 3/2015 Pruitt ................... A44C 5/2071
  24/303

* cited by examiner

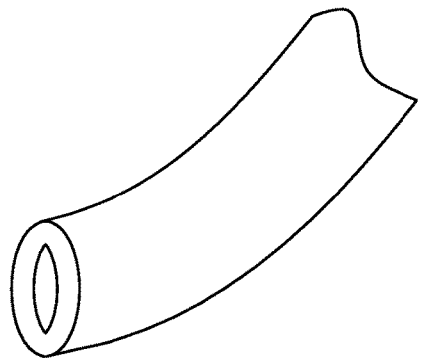
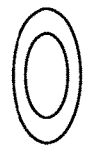
FIG. 7A  FIG. 7B
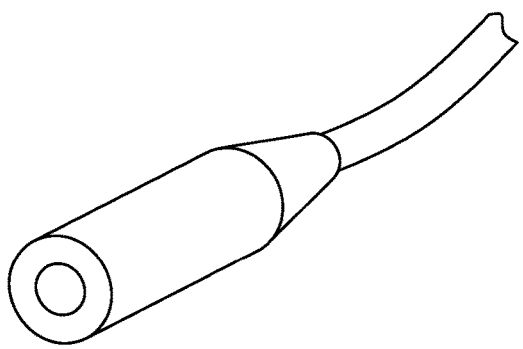
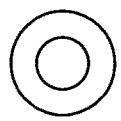
FIG. 7C  FIG. 7D
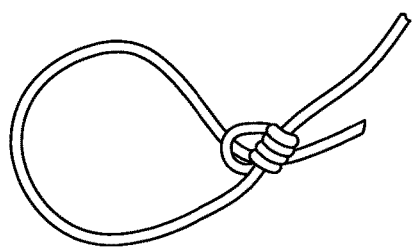
FIG. 7E  FIG. 7F

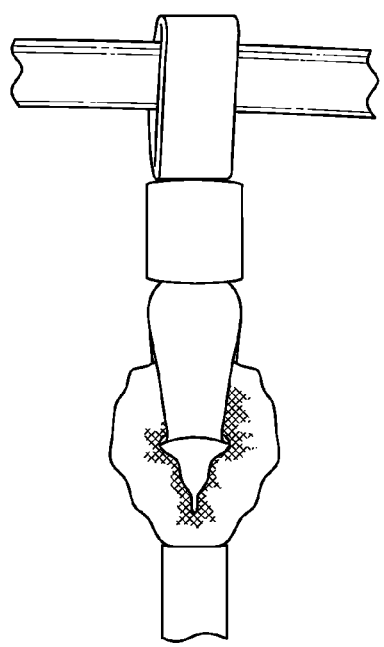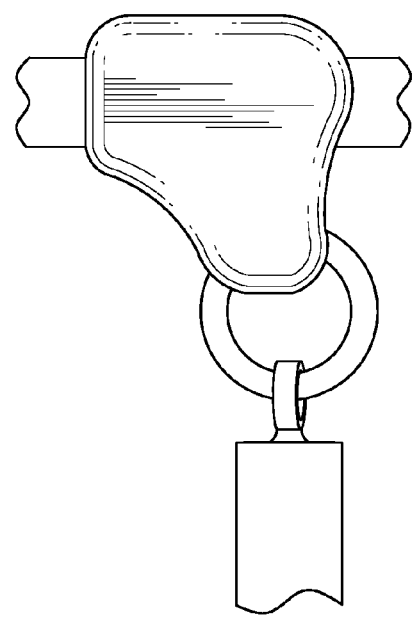
FIG. 10A
FIG. 10B

EYEGLASS RETENTION DEVICE

CROSS-REFERENCE TO RELATED APPLICATION

This application is a Continuation-in-Part of U.S. patent application Ser. No. 14/267,979 entitled "Eyeglass Retention Device" and filed May 2, 2104. The disclosure of U.S. patent application Ser. No. 14/267,979 is hereby incorporated by reference herein in its entirety.

FIELD OF THE DISCLOSURE

The subject matter of the present disclosure generally relates to the retention of eyeglasses by a user, and more particularly relates to the retention of two pairs of eyeglasses around the neck of a user.

BACKGROUND OF THE DISCLOSURE

There are numerous devices for the retention of a single pair of glasses around the neck of a user. Typically, such devices include a single band or tube, each end of which is attached to a temple of a pair of eyeglasses. When the user does not wish to don the glasses, but nonetheless wishes them secure, safe, and readily available, the user removes the glasses and allows the glasses to hang, secured to their body by the placement of the band around the user's neck. U.S. Pat. Nos. 7,467,867, 4,133,604, 4,820,036, 8,277,046, 5,384,605 and 8,317,319 each disclose variations of this basic concept. U.S. pat. No. 7,896,492 discloses a combination eyewear and accessory holder. U.S. Pat. No. 5,384,605 discloses a dual-purpose device that serves as both a glasses retainer and a sweatband. The disclosures of U.S. Pat. Nos. 7,467,867, 4,133,604, 4,820,036, 8,277,046, 5,384,605, 8,317,319, 7,896,492 and 5,384,605 are incorporated by reference herein in their entirety.

However, problems persist for users that seek to simultaneously make use of multiple pairs of glasses, such as prescription eyeglasses and sunglasses. These users must select only one of the eyeglasses for immediate use and attempt to store the other pair. Often the unused pair must be placed in a pocket or other area where it may be subject to damage or breakage. In situations where no such storage space is available, for example when a user is in a swimsuit on a beach, the unused eyeglasses are particularly vulnerable. Furthermore, traditional eyeglass cases may be aesthetically unpleasing and prone to loss or theft.

Certain designs have been proposed for allowing users access to multiple pairs of glasses. For instance, U.S. Pat. No. 7,780,289, entitled "Dual Eyewear Strap" and filed Mar. 2, 2007, discloses a single band that splits into two connectors at either end. However, such a design would be expected to slip easily along a user's neck, especially during heavy activity, and further provides no means by which to selectively decouple one of the pairs of eyewear.

U.S. Pat. No. 6,899,423, entitled "Holding Apparatus for Eye Glasses" and filed Feb. 24, 2004, discloses a holding apparatus akin to previously available retention devices in many aspects but utilizing magnetic attachment points to secure a holding band to a pair of eyeglasses, and wherein magnetic "clip on" sunglasses may be optionally attached. However, this apparatus has several disadvantages. First, it cannot be employed by those having two sets of eyeglasses where both have traditional ear pieces, for instance, by a user with both eyeglasses and safety glasses. Furthermore, the secondary set of eyeglasses will still suffer from the same concerns relating to loss or damage.

U.S. Pat. No. 8,684,519, entitled "Dual Eyeglasses" and filed Jun. 27, 2011, discloses a first and second set of eyeglasses coupled together by a shared set of temples. The temples are rigid and serve to interconnect the eyeglasses, so that when a user dons one pair of eyeglasses, the other pair is disposed against the back of the user's head. This configuration would be expected to be uncomfortable and aesthetically unpleasing to many users. The disclosures of U.S. Pat. No. 7,780,289, 6,899,423, and 8,684,519 are hereby incorporated by reference herein in their entirety.

The subject matter of the present disclosure is directed to overcoming, or at least reducing the effects of, one or more of the problems set forth above.

BRIEF SUMMARY OF THE DISCLOSURE

Disclosed is a dual eyeglass retention device that allows a user to secure two separate pairs of eyeglasses to their person. In a first embodiment, two bands connect the temples or other securement areas of the sides of two separate eyeglass pairs. For instance, the left temple of a first eyeglass pair is connected via a first band to the right temple of a second eyeglass pair, and the right temple of the first eyeglass pair is connected to the left temple of the second eye glass pair. The user is then able to don one of the pairs of the eyeglasses while the other pair is suspended against the user's back via the bands. Thus, transitioning between the pairs only requires the user to take off the first pair of eyeglasses and rotate the device around so that the second pair of eyeglasses can be donned.

The unused eyeglasses are kept safe and readily available. The unused pair of eyeglasses do not need to be held in the user's hands and no pocket or other storage space is necessary.

In a second embodiment, two retention bands extend from either side of a neck band, so that when the device is donned a user can wear one of the pairs of glasses while the other hangs against their chest.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which:

FIG. 7A is a perspective view of a first retaining device and elongated band section.

FIG. 7B is a cross section view of the retaining device of FIG. 7A.

FIG. 7C is a perspective view of a second retaining device and elongated band section.

FIG. 7D is a cross section view of the retaining device of FIG. 7C.

FIG. 7E is a perspective view of a third retaining device and elongated band section.

FIG. 7F is a cross section view of retaining device of FIG. 7E.

FIGS. 10A and 10B are side views of two optional attachment means according to certain embodiments.

Like reference numbers and designations in the various drawings indicate like elements.

DETAILED DESCRIPTION

Disclosed is a retention device for the securement of two pairs of eyeglasses.

Figure 1:
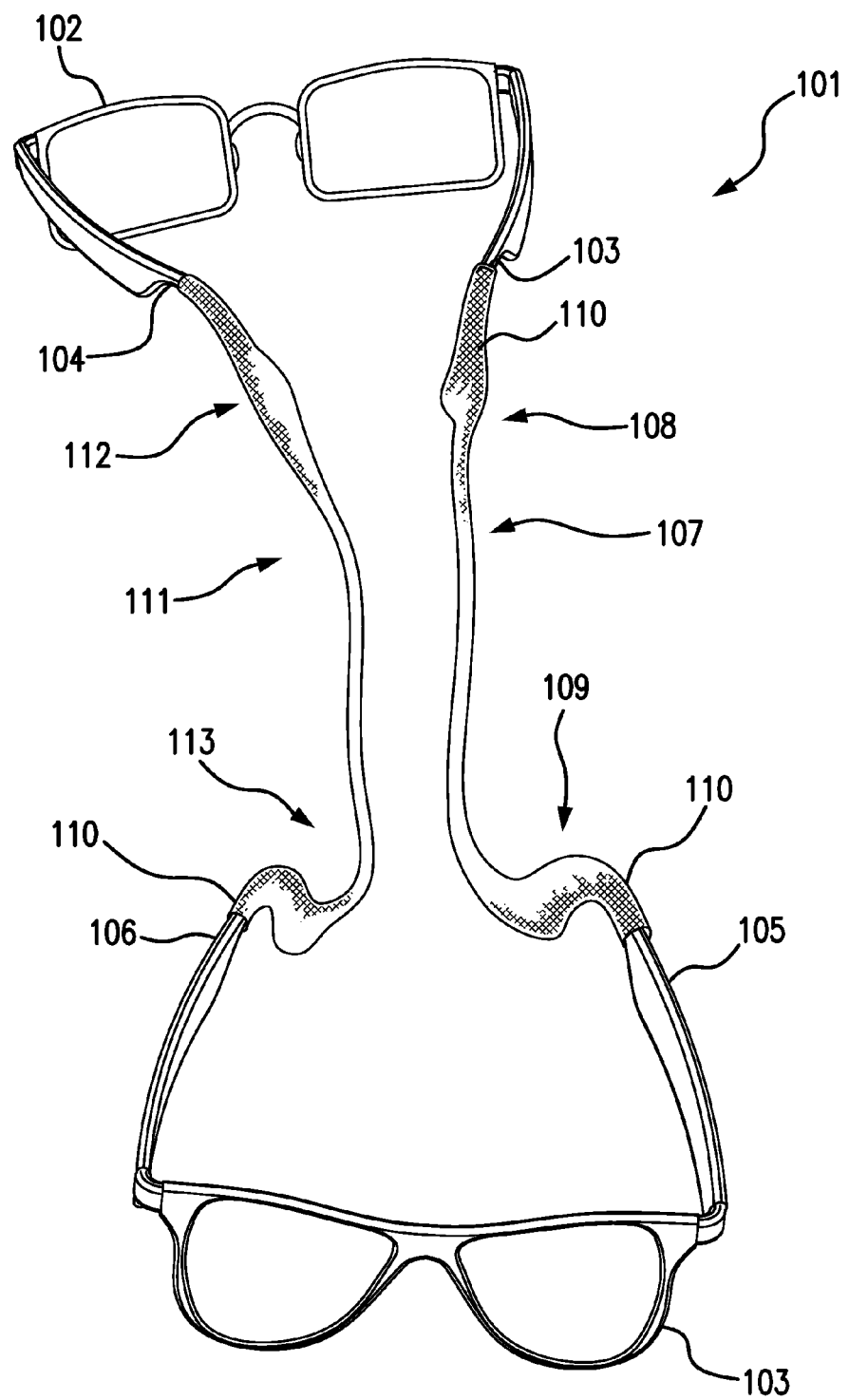
FIG. 1 is an illustration of a first embodiment.

FIG. 1 is an illustration of a first embodiment. Retention apparatus 101 is used to secure first pair of eyeglasses 102 and second pair of eyeglasses 103. First pair of eyeglasses 102 has first temple 103 and second temple 104. Similarly, second pair of eyeglasses has first temple 105 and second temple 106. First elongated band 107 has a first end 108 and second end 109, each of which have a retention device 110. Second elongated member 111 has a first end 112 and a second end 113, each of which has a retention device 110.

Figure 3:
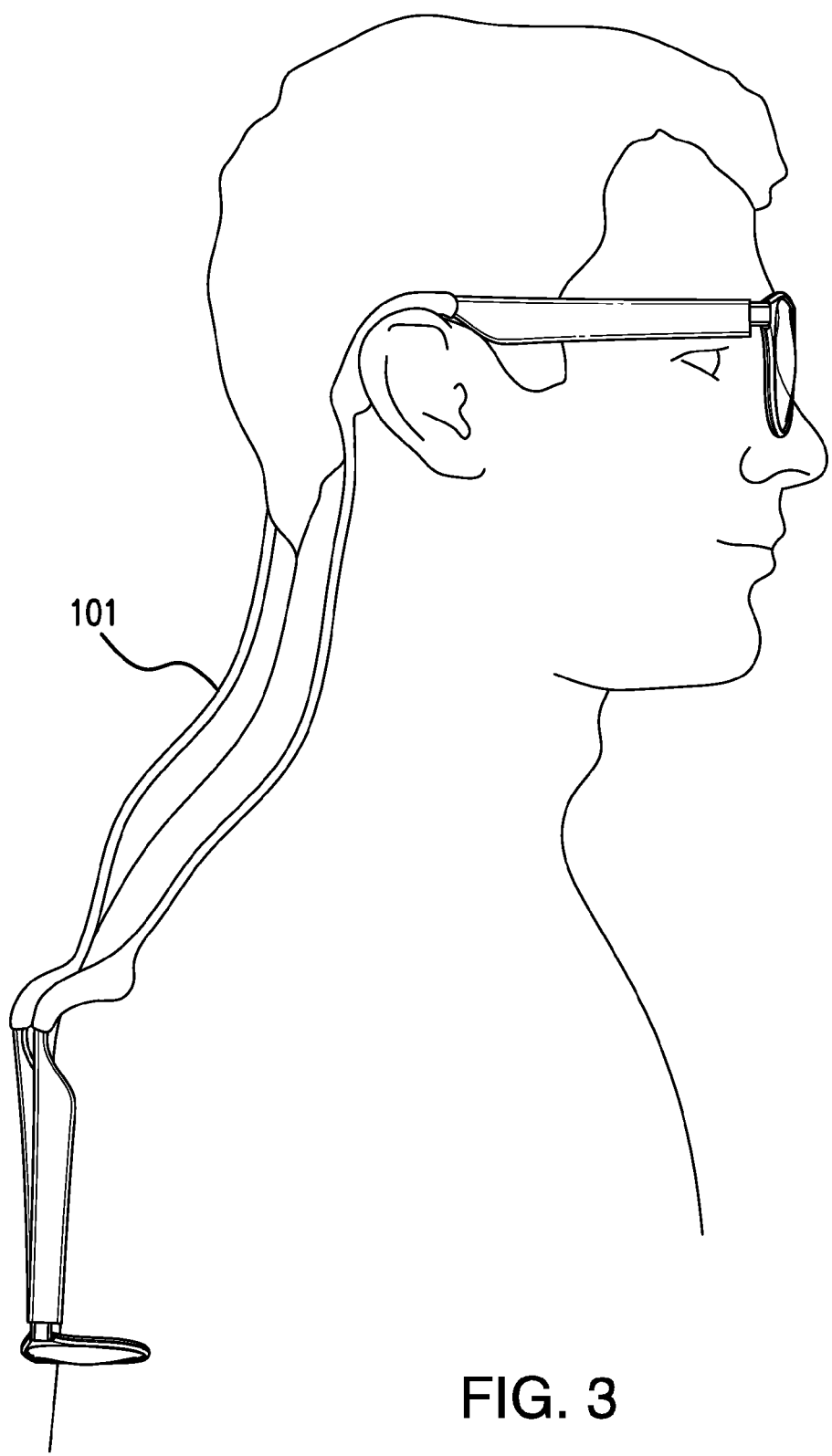
FIG. 3 is an illustration of the embodiment of FIG. 1 with one pair of eyeglasses donned by a user.

Retention devices 110 of first end 108 and first end 112 grasp first temple 103 and second temple 104 of eyeglasses 102, respectively. Similarly, retention devices 110 of second end 109 and second end 113 grasp first temple 105 and second temple 106 of eyeglasses 103. When a user dons eyeglasses 102, eyeglasses 103 are disposed against the back of the user. To switch to eyeglasses 103, the user simply removes eyeglasses 102 and rotates retention apparatus 101 in a 180° movement. FIG. 3 illustrates retention apparatus 101 as donned on a user.

The term eyeglasses should be understood to broadly include various optical devices, such as glasses and sunglasses, and other similar devices, such as the electronic augmentation system GOOGLE GLASS, manufactured by Google, Inc. of Mountain View, Calif.

Figure 2:
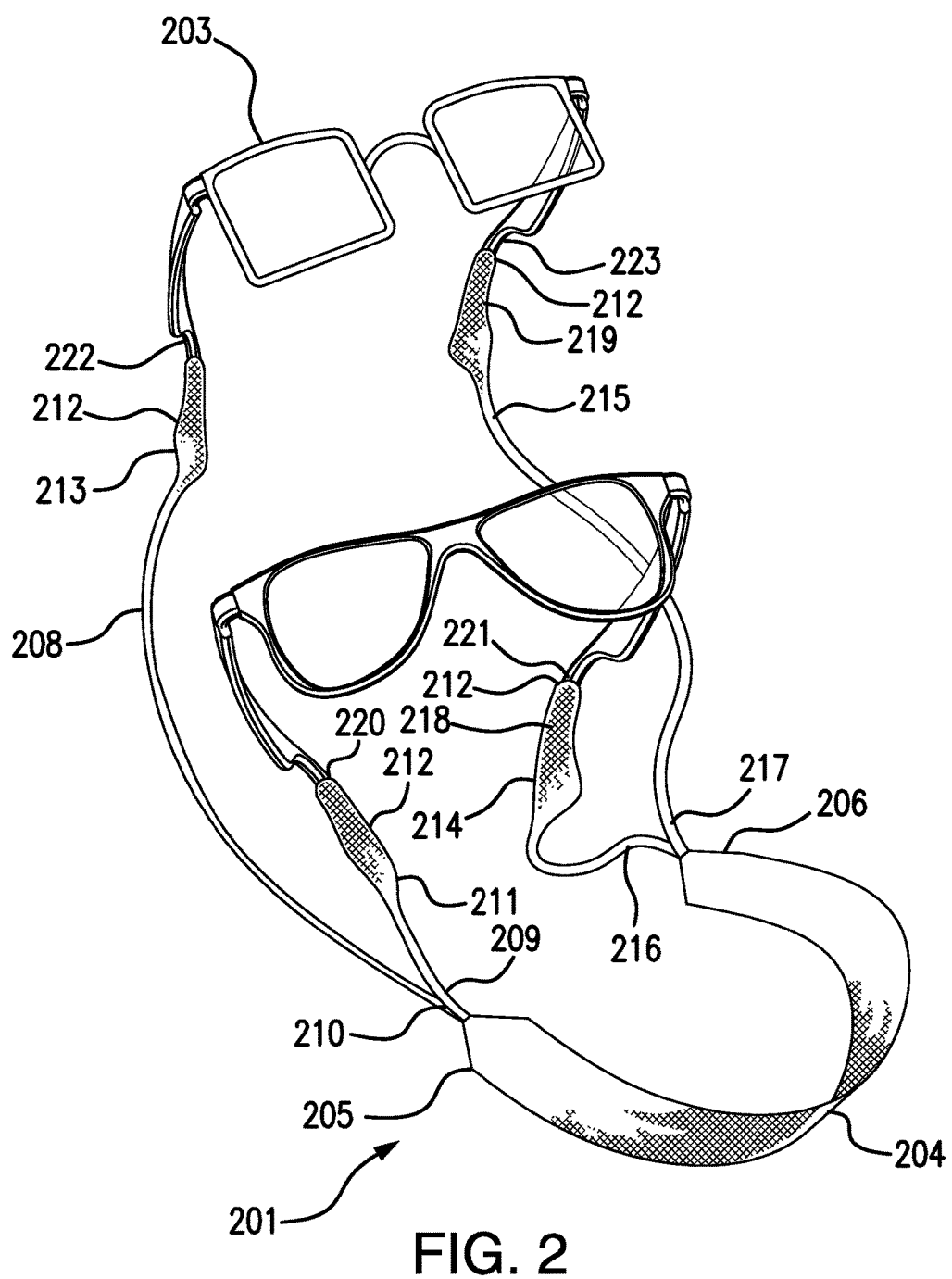
FIG. 2 is an illustration of a second embodiment.
Figure 4:
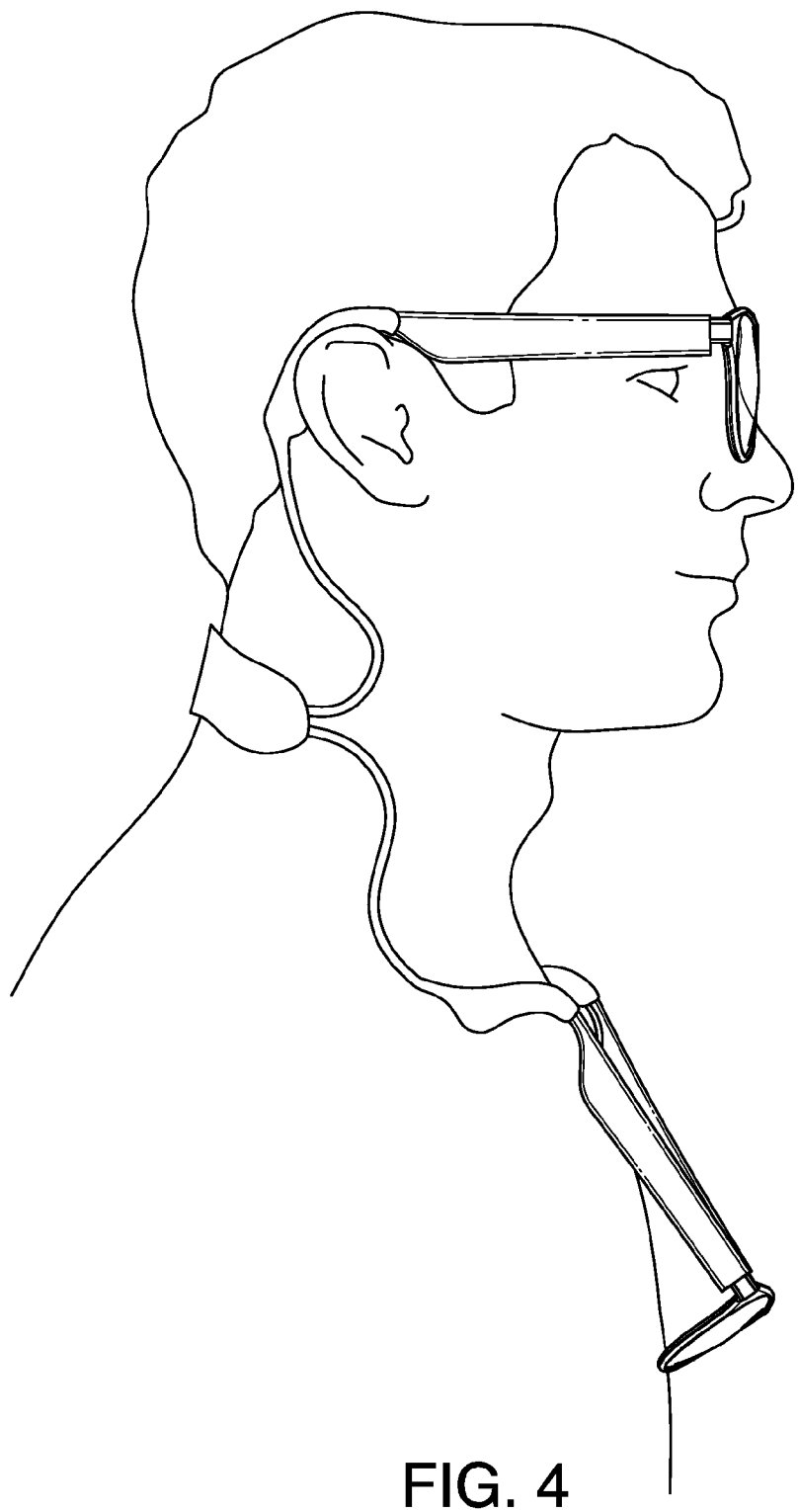
FIG. 4 is an illustration of the embodiment of FIG. 2 with one pair of eyeglasses donned by a user.

FIG. 2 is an illustration of a second embodiment. Retention apparatus 201 is used to secure first pair of eyeglasses 202 and second pair of eyeglasses 203. Neckband 204 has first end 205 and second end 206. First retaining band 207 and second retaining band 208 are connected at first end 209 and first end 210, respectively, to neckband first end 205. First retaining band 207 has disposed at second end 211 retention device 212. Similarly, second retaining band 208 has disposed at second end 213 retention device 212. Third retaining band 214 and fourth retaining band 215 are connected at first end 216 and first end 217, respectively, to neckband second end 206. Third retaining band 214 has disposed at second end 218 retention device 212. Similarly, fourth retaining band 215 has disposed at second end 219 retention device 212. Retention devices 212 at second end 211 and second end 218 are configured to grasp first temple 220 and second temple 221 of eyeglasses 202. Similarly, retention devices 212 at second end 213 and second end 219 are configured to grasp first temple 222 and second temple 223 of eyeglasses 203. FIG. 4 illustrates retention apparatus 201 as donned on a user.

It will be understood by those of skill in the art to which the present disclosure pertains that neckbands may be made from various suitable materials, such as leather, various fabrics and the like, and may be divided into various sections. For instance, a main portion may be made by a material that will be particularly comfortable when disposed on a user's neck, such as a soft pad, while outer ends of the neckband may be made from a polymer material that secures the retention bands to the neckband. Neckbands can also optionally be constructed from a material that is suitable for securement against a neck of a user, such as various rubbers.

Similarly, various materials are suitable for use in retaining bands and elongated members, such as cordage, various flexible plastics and polymers, coated or uncoated wire, etc.

Figure 5A:
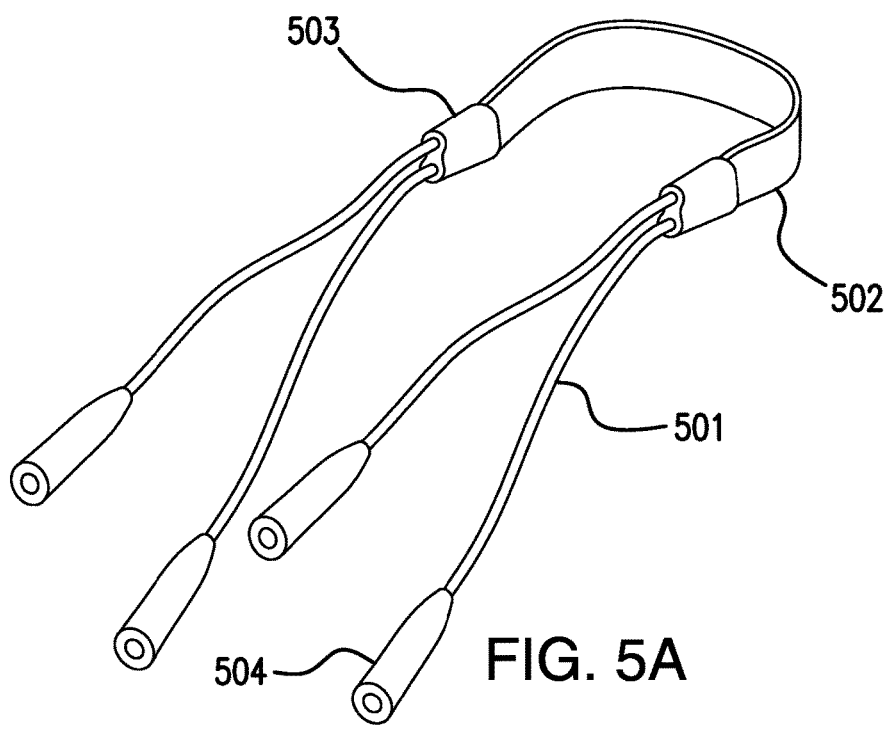
FIG. 5A is a perspective view illustration of an alternate embodiment.
Figure 5B:
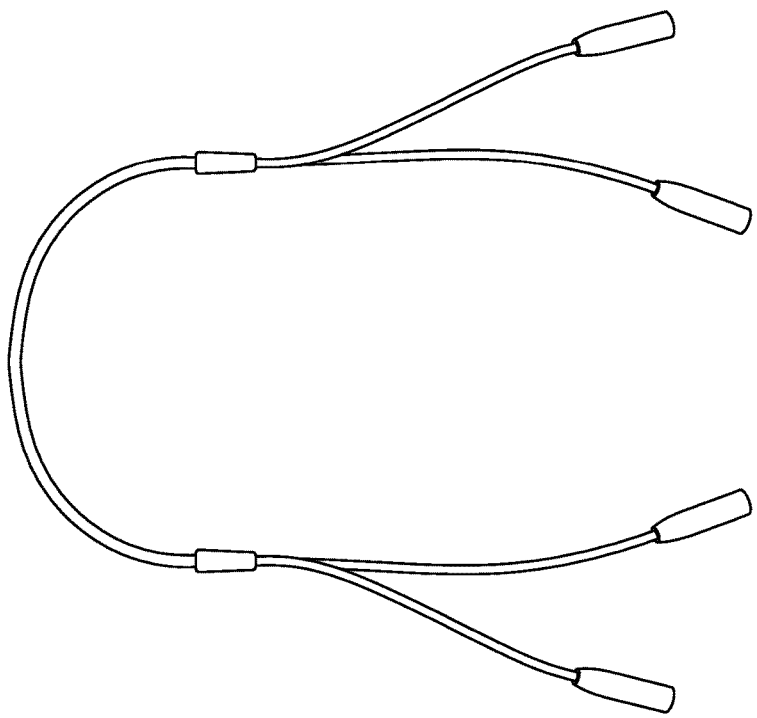
FIG. 5B is a top view illustration of the alternate embodiment of FIG. 5A.

FIGS. 5A-B illustrate an alternate embodiment. Retaining bands 501 are connected to neckband 502 at attachment sleeves 503. Retention devices 504 are attached to the ends of retaining bands 501.

Figure 6:
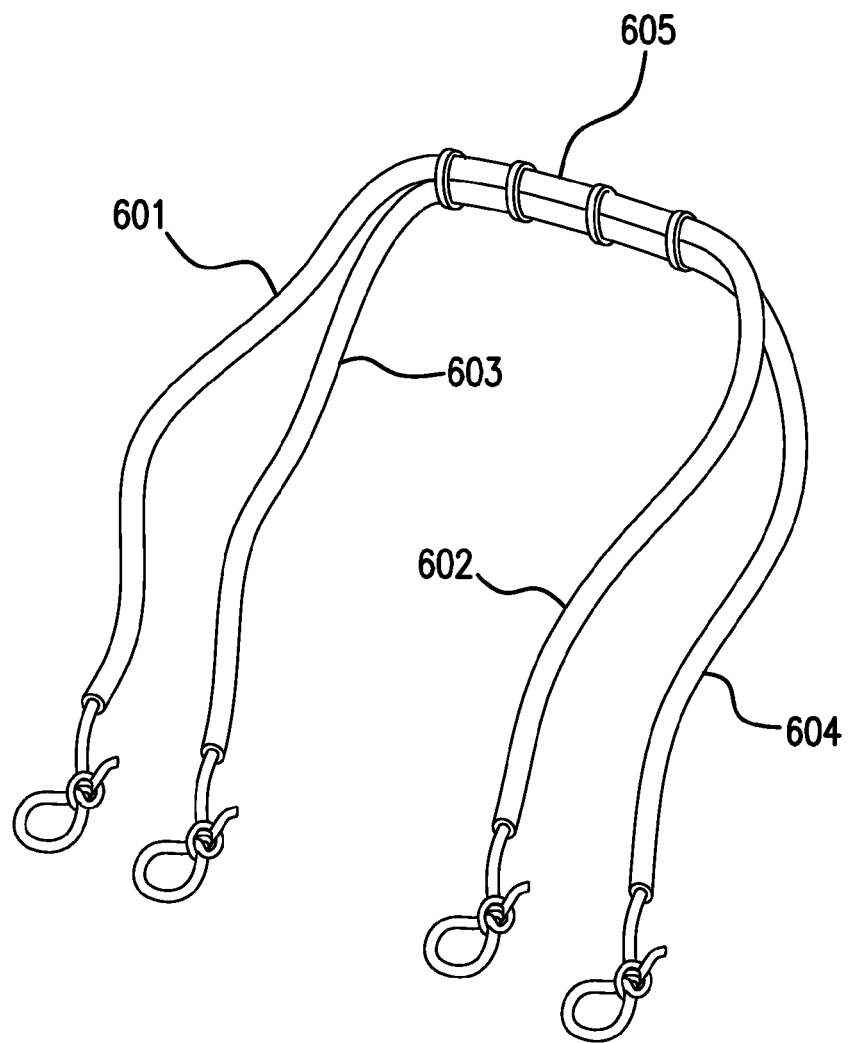
FIG. 6 is a perspective view illustration of another alternate embodiment.

FIG. 6 illustrates an alternate embodiment in which retaining bands 601 and 602 are formed from one strand of material and 603 and 604 are formed from another strand of material, the strands of material being bound together at neckband 605.

Retention devices for use in grasping the temples of eyeglasses may be any suitable retention device, such as grommets, crimps, rubber tubing, string ties, elastic material, etc. FIGS. 7A-F are illustrations of various types of retention devices for use with various embodiments. For instance, FIG. 7B illustrates a cross section of a continuous member depicted in perspective view in 7A. FIG. 7C depicts a retention device that is larger than its accompanying retaining band, allowing a smaller retaining band to be used while still adequately securing a pair of eyeglasses. FIG. 7D depicts a cross section of the retaining device of FIG. 7C. FIG. 7E shows a retention device that is a knotted closure (a solid cross section of which is depicted in FIG. 7F).

Figure 8:
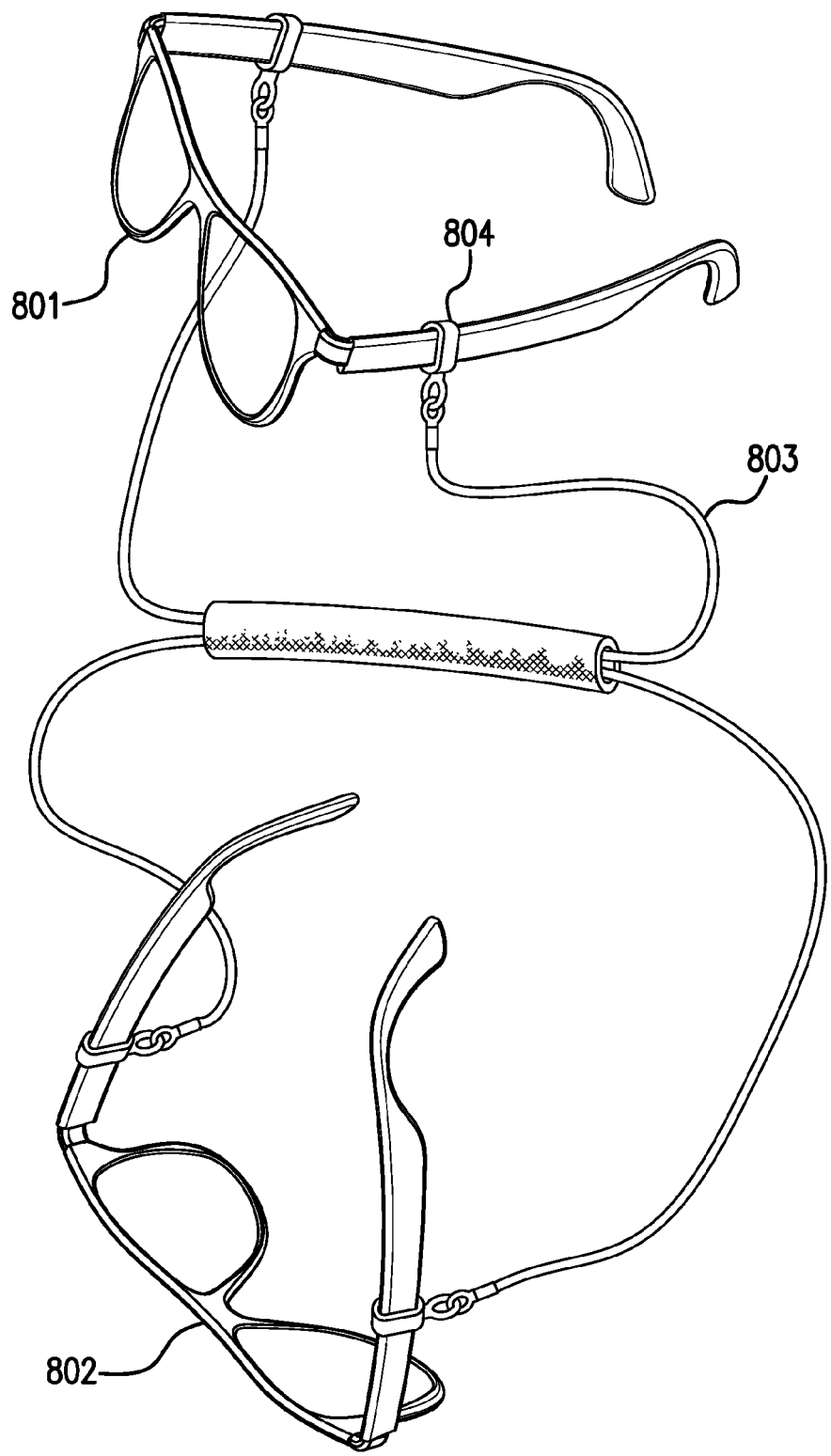
FIG. 8 is a perspective view of another alternate embodiment.

With reference to FIG. 8, connection between eyeglasses 801 and 802 and dual eyeglass retention apparatus 803 is made by retention devices 804 secured in forward positions on the eyeglasses, as opposed to at the end of the temples (as depicted in FIG. 1). Such a configuration may be favored by certain individuals for its comfort, operation or aesthetic appearance.

Figure 9A:
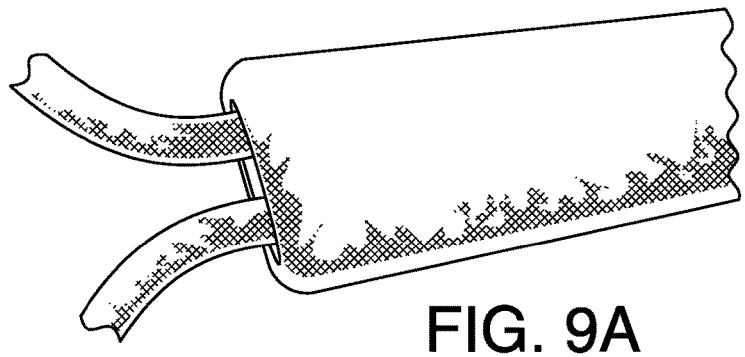
FIGS. 9A-9C are detailed perspective views of features of another alternate embodiment.
Figure 9B:
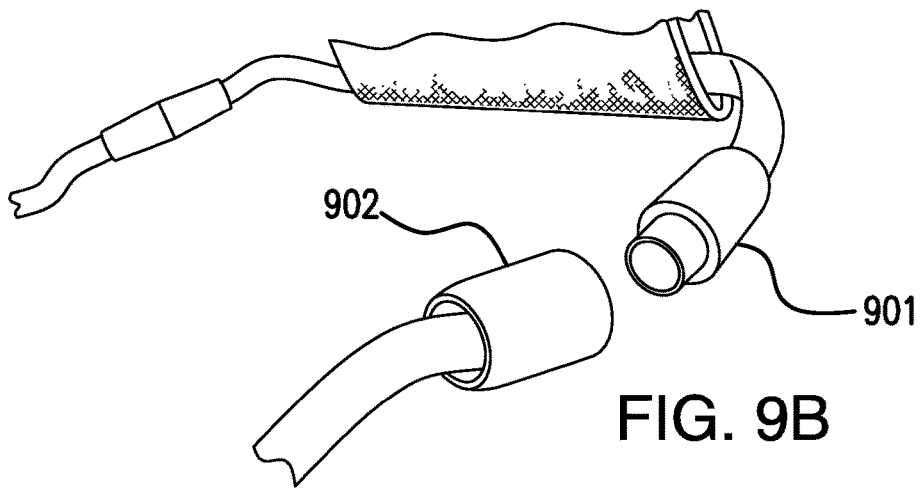
Figure 9C:
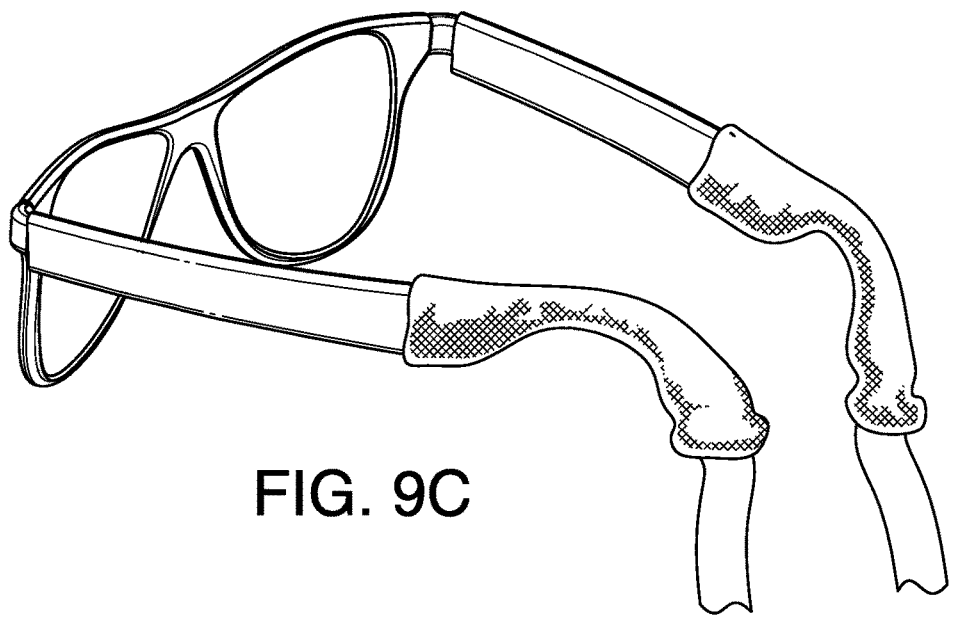

FIG. 9A is a detailed depiction of a portion of a headband of an alternate embodiment. Optionally, the headband may be adorned by a pattern or other decoration. In the embodiment, a logo tag is attached to the headband to denote the product's origins. FIG. 9B depicts a connector device for use in certain embodiments. Male connector 901 is configured to interconnect with female connector 902. Preferably, such interconnection is facilitated by magnetic attraction, though snapping or other locking mechanisms may be employed. In such a configuration, a user may choose to quickly and easily disconnect or reconnect one set of eyeglasses and their attendant straps while maintaining the retaining structure for the other set of eyeglasses. Thus, the user can quickly transition between retaining a single set of eyeglasses and retaining two according to their dynamic desires or surrounding conditions. FIG. 9C depicts connection of a retaining head strap by retention devices connected at the distal end of the eyeglasses' temples.

FIGS. 10A and 10B depict two alternate retention devices for attachment to a forward portions on the temples of eyeglasses. Those of skill in the art to which the present disclosure pertains will appreciate that the material and finish of such devices may vary according to aesthetic or other considerations. For instance, transparent materials may be used, or surfaces may be alternatively embossed or smooth.

Figure 11:
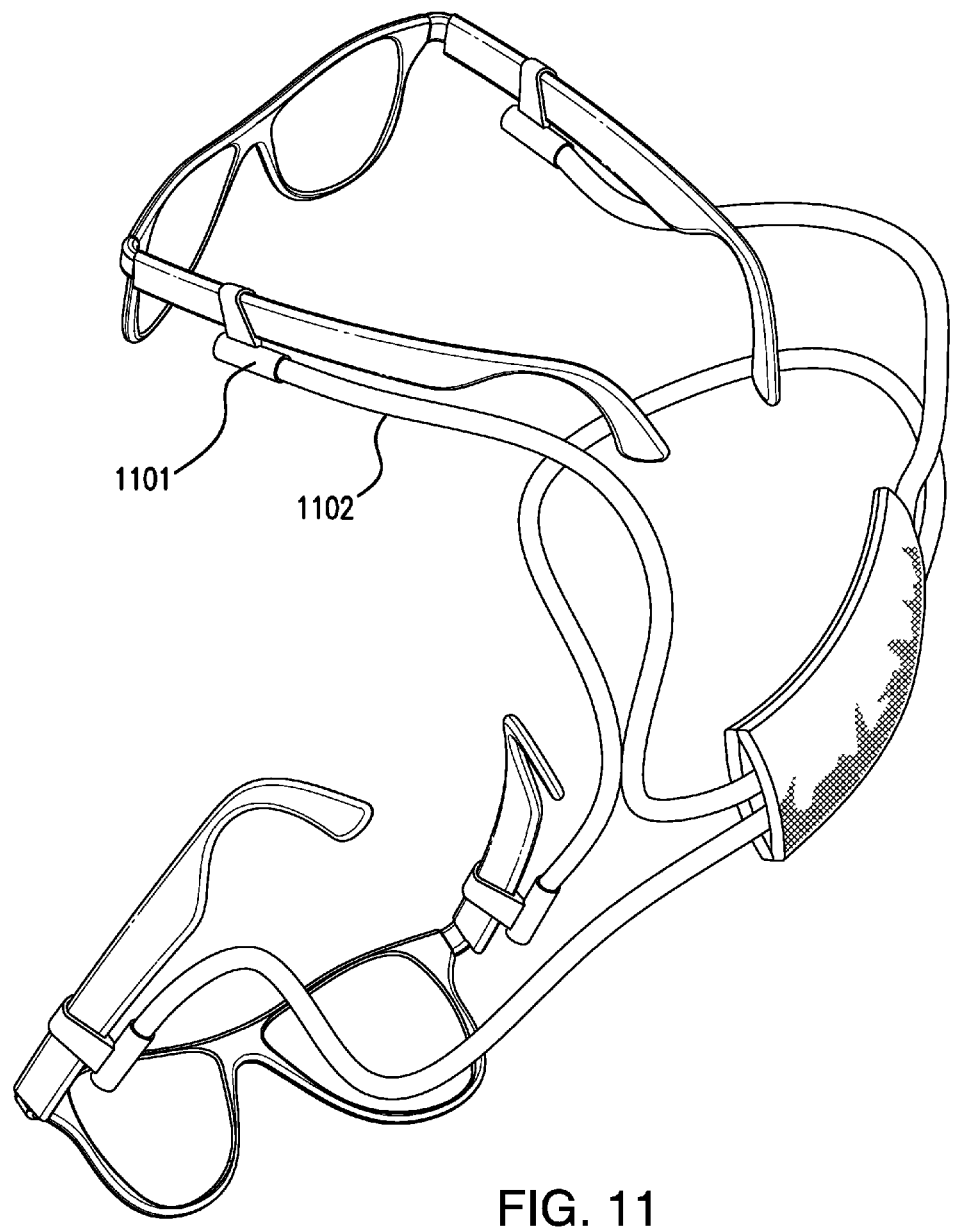
FIG. 11 is a perspective view of another alternate embodiment having a backstrap.

FIG. 11 depicts an alternate embodiment in which retention devices 1101 are rubber end pieces connected to the forward temples of the eyeglasses. Retention bands 1102 are connected to retention devices 1101 in an orientation parallel to the longitudinal axis of the temples.

Figures 12A, 12B:
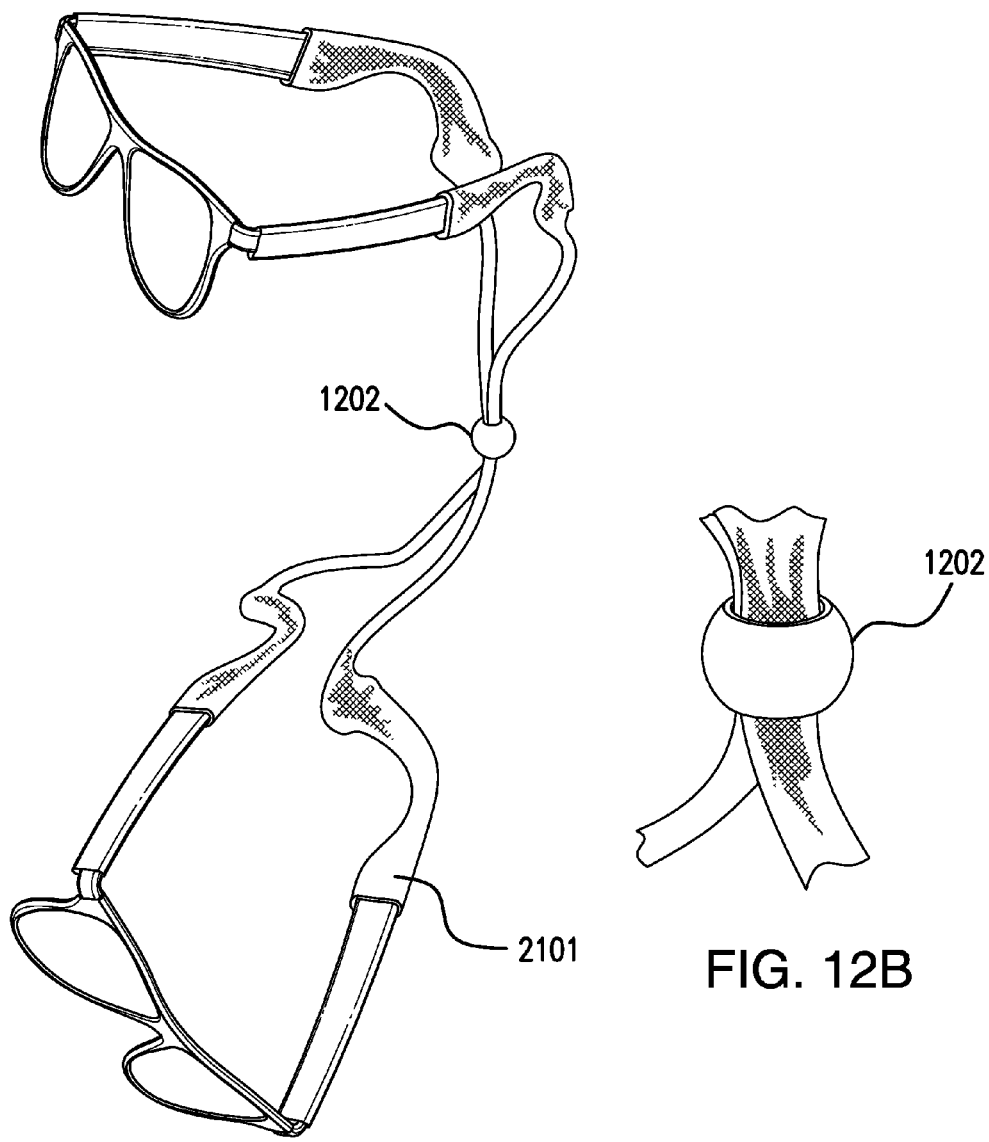
FIGS. 12A and 12B provide perspective views of another alternate embodiment having a single central strap cinch.

FIG. 12A depicts an alternate embodiment in which retention bands 1201 are nylon fabric tubing. Cinch 1202 holds retention bands 1201 together at a single point. Such as configuration allows a user to organize and prevent the retention bands from separating from one another while eliminating the need for a headband or other elements that may undesirably increase weight. FIG. 12B is an expanded view of cinch 1202.

Figures 13A, 13B:
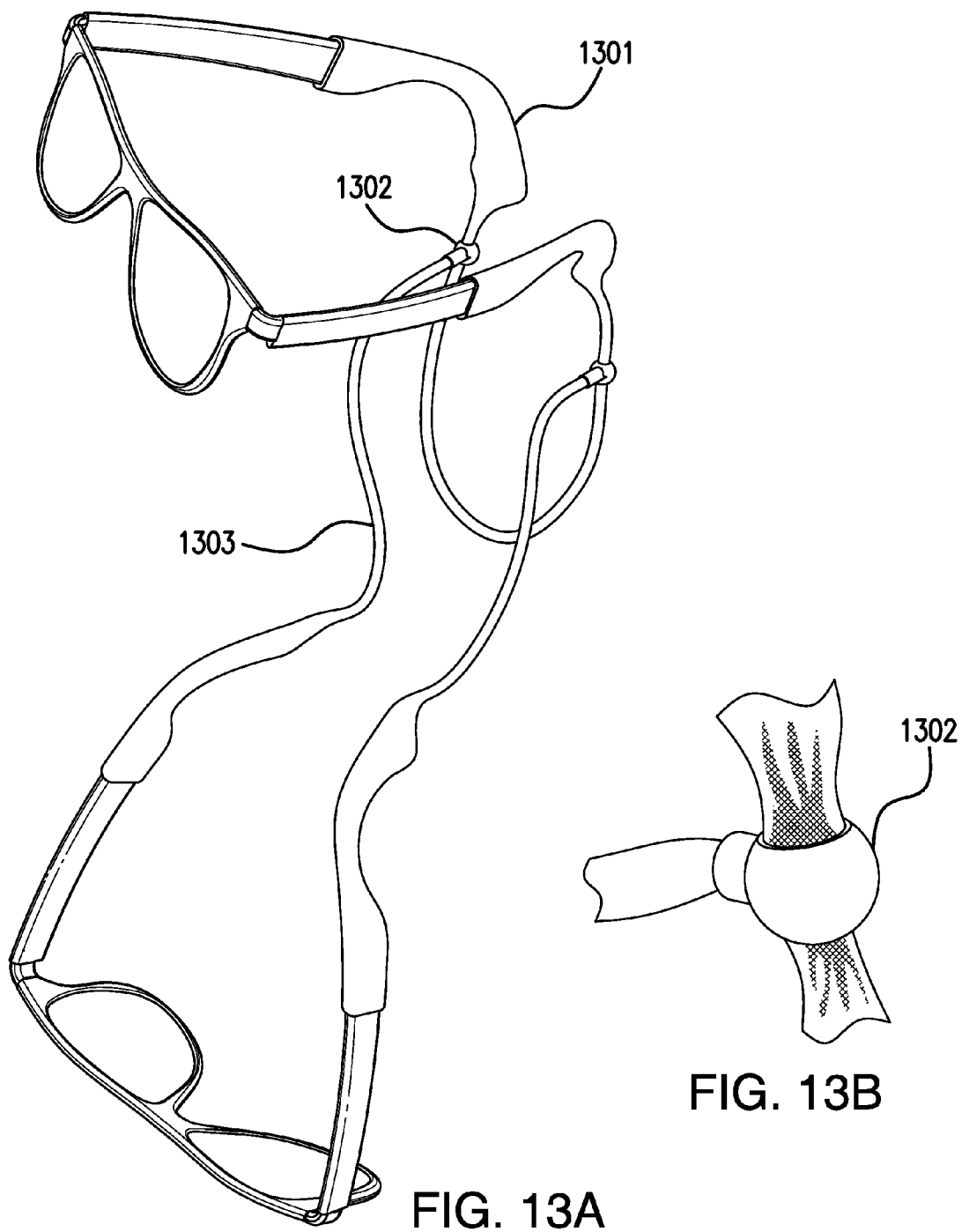
FIGS. 13A and 13B provide perspective views of another alternate embodiment having two 3-point sliders.

FIG. 13A depicts an alternate embodiment in which retention band 1301 is fed through 3-point sliders 1302 while a first and second end of retention band 1303 terminate each terminate at one of sliders 1302. FIG. 13B is a magnified view of one of sliders 1302.

Figures 14A, 14B:
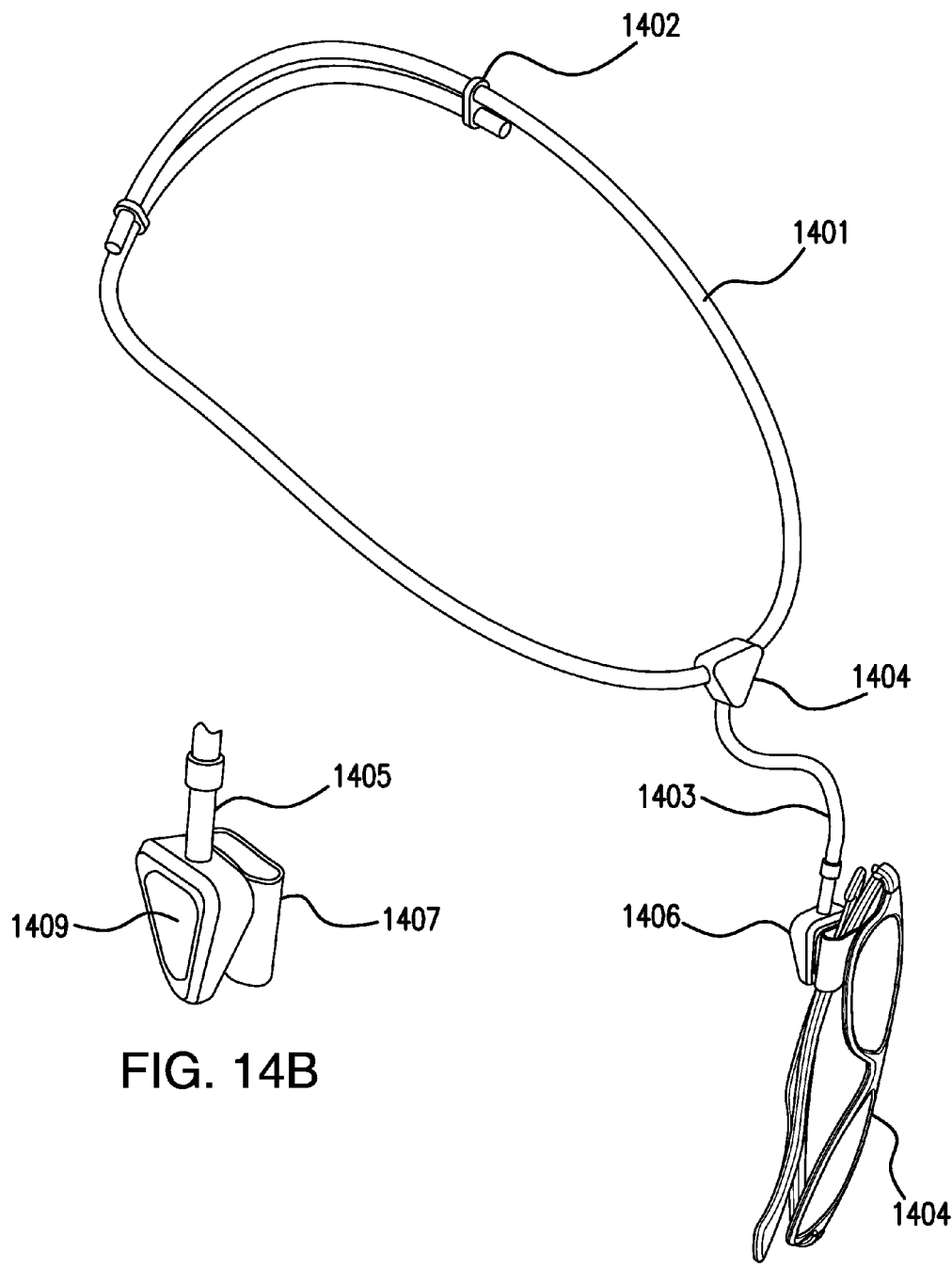
FIGS. 14A and 14B provide perspective views of another alternate embodiment having a quick-detachment connector.

FIG. 14 depicts another alternate embodiment. Neck band 1401 has connectors 1402, which together form neck band 1401 into a loop. Preferably, connectors 1402 can be adjusted so that the circumference of the loop may be altered. Retention band 1403 is connected to neck band 1401 by connector 1404, which preferably may be slid along neck band 1401 to adjust the relative position of retention band 1403. Connector pin 1405 at the end of retention band 1403 is configured to interlock with quick-detach mechanism 1406. In the embodiment, quick-detach mechanism 1406 includes sleeve 1407 that is configured to be secured to a temple of eyeglasses 1408. To remove eyeglasses 1408 from retention band 1403, a user presses release button 1409. To reconnect eyeglasses 1408 to retention band 1403, a user simply inserts connector pin 1405 into a corresponding receptacle in quick-detach mechanism 1406.

Figure 15A:
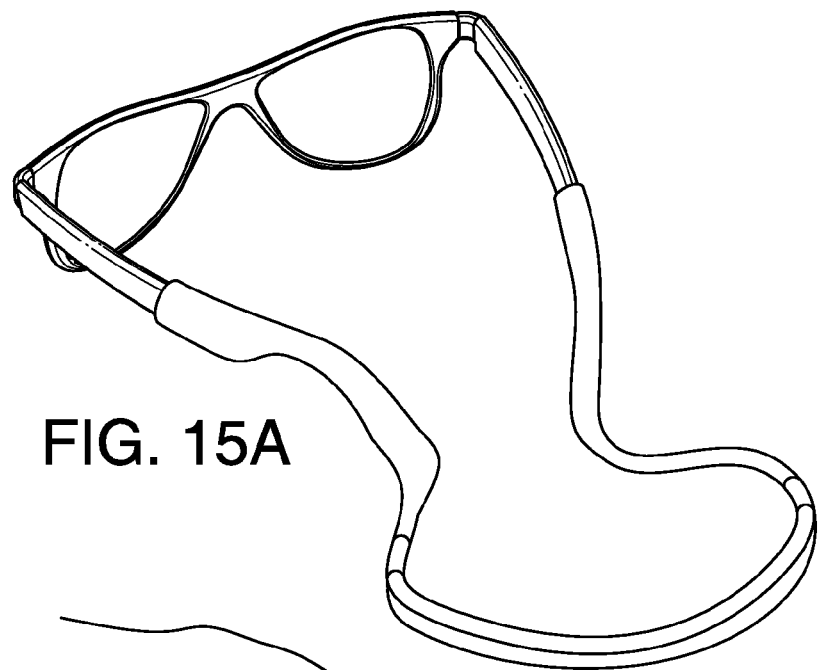
FIGS. 15A-15C depict a feature of certain alternate embodiments in which a neckband serves as an optional cleaning cloth and case.
Figure 15B:
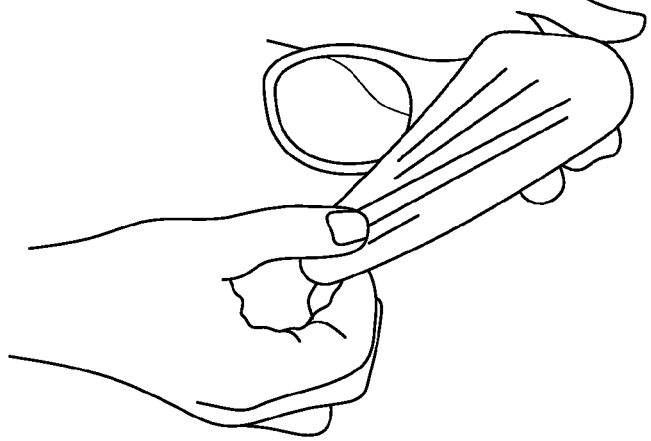
Figure 15C:
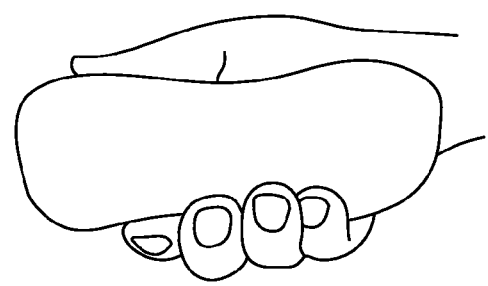

FIG. 15 depicts a convertible neckband made out of an elastic material that is configured to be convertible. As shown in FIG. 15A, the neckband can serve the function of allowing a user to secure eyeglasses around their neck. As shown in FIG. 15B, the elastic material can be stretched around the eyeglasses when they are folded, so as to protect the lenses as a convertible case as shown in FIG. 15C. One of ordinary skill in the art to which the present application pertains will understand that the convertible neckband may be employed with various other embodiments as described herein.

Figure 16:
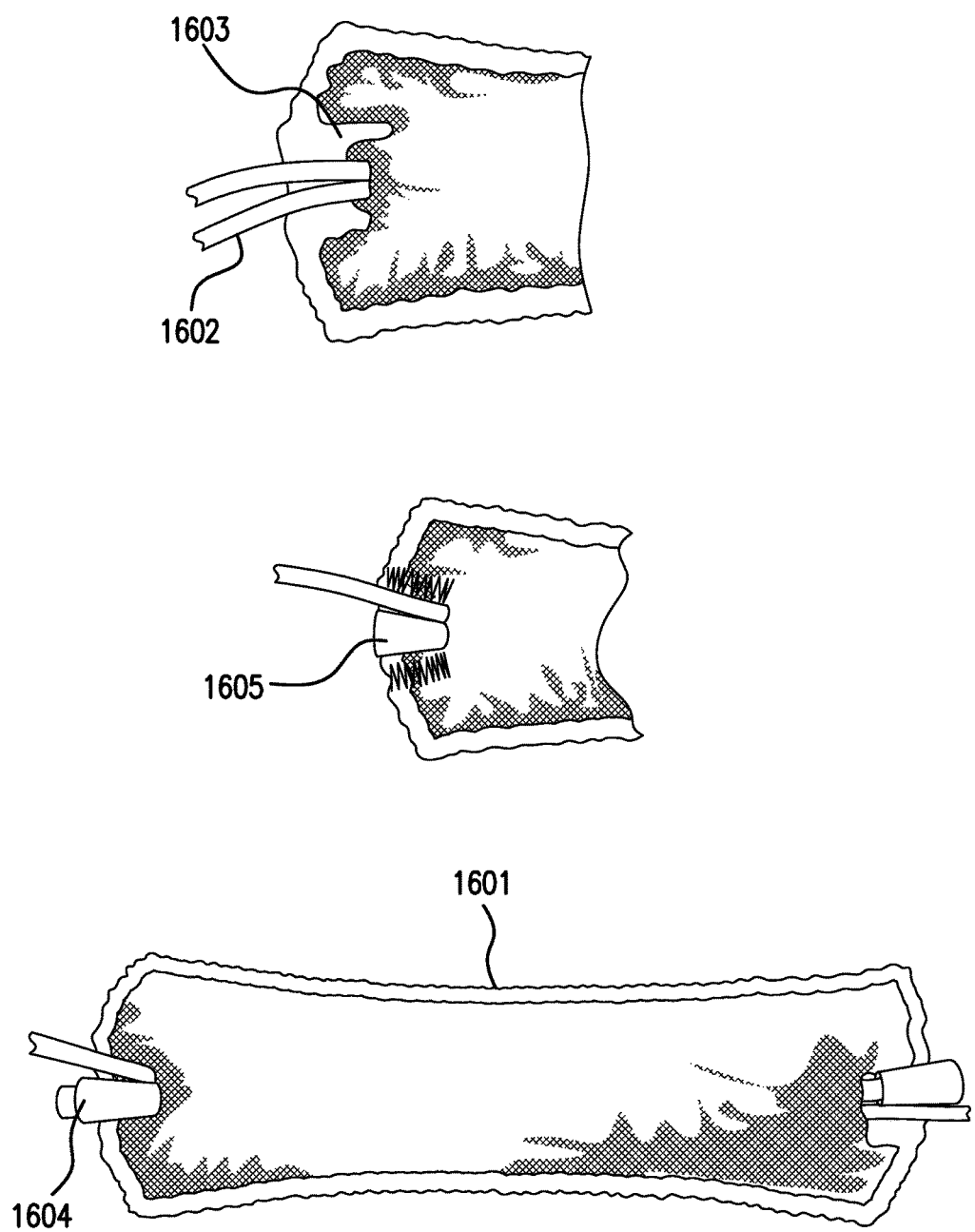
FIG. 16 depicts a neckband according to certain alternate embodiments.

FIG. 16 depicts neckband 1601 according to certain embodiments. Retention bands 1602 run through channel 1603, allowing the user to adjust the positioning of neckband 1601. According to certain embodiments, retention bands 1602 have connector devices 1604 which may allow, for instance, decoupling of two pairs of eyeglasses. In the embodiment, when all of the length of a retention band that ends with a connector device has been pulled through neckband 1601, connector device 1604 is caught by stitching 1605 so connector device 1604 does not pass through channel 1603. Formation of a U-shaped opening for channel 1603 can ensure connector device 1604 does not irritate a user's neck when connector device 1604 is disposed next to channel 1603.

Figure 17:
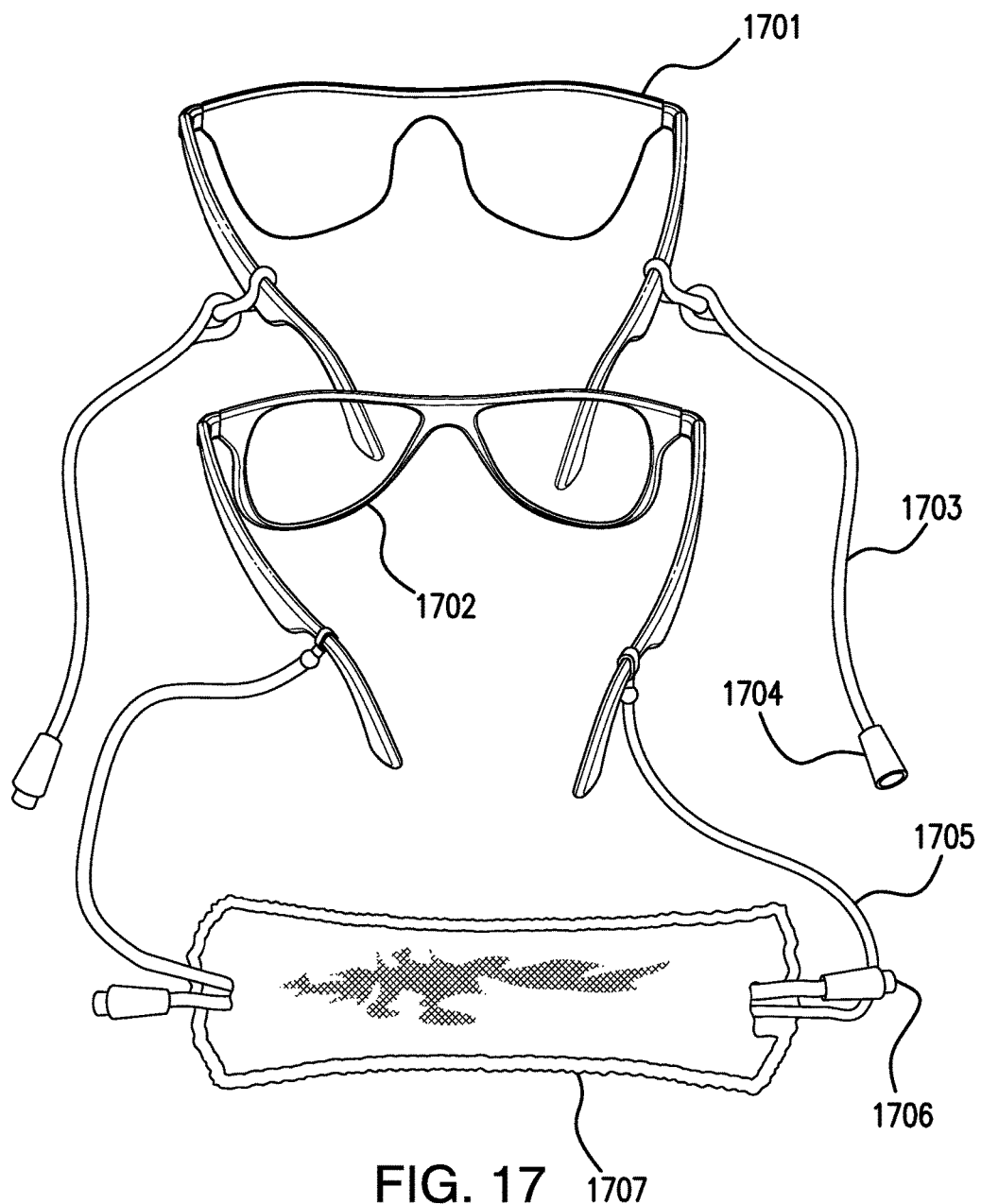
FIG. 17 depicts another alternate embodiment having two quick-detach connection points.

FIG. 17 depicts an another alternate embodiment that permits a user to selectively don one or both of eyeglasses 1701 and 1702. A first set of retention bands 1703 are connected to eyeglasses 1701 and terminate in female connectors 1704. A second set of retention bands 1705 are connected to eyeglasses 1702 and terminate in male connectors 1706. In the embodiment, retention bands 1704 are partly encased by neckband 1707. In a first configuration, the user may connect female connectors 1704 with their counterpart male connectors 1706 so that both eyeglasses are retained by donning neckband 1707. If the user wishes to only have eyeglasses 1702 readily available, they may disconnect connectors 1704 and 1706, in which case male connectors 1706 will rest against openings in neckband 1707 when eyeglasses 1702 are left to hang on the user's chest.

Retention bands may be constructed from any suitable resilient material. Materials used in previous eyeglass retainers may be employed. Particularly, paracord, braided material, leather, nylon tubing, etc. may be optionally employed. Similarly, the lengths of retention bands and elongated members may vary depending on their particular use or other criteria.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention. For instance, various types of retaining devices, retention bands, and neckbands may be readily combinable to form alternate embodiments to those explicitly disclosed and depicted.

What is claimed:

1. An eyeglass retention apparatus, comprising:
    a first and second retention band, each having disposed at a first end a retention device configured to be affixed to a temple of a first pair of eyeglasses, and each having disposed at a second end, distal from the first, a male connector element;
    a third and fourth retention band, each having disposed at a first end a retention device configured to be affixed to a temple of a second pair of eyeglasses, and each having disposed at a second end, distal from the first, a female connector element;
    wherein the male connector elements of the first and second retention bands are configured to disconnectably interlock with the female connector elements of the third and fourth retention bands, respectively, whereby the first and second pair of eyeglasses are collectively retained;
    wherein a length of the first and second retention bands passes through an interior channel of the neckband; and
    wherein the neckband has a first and second opening configured to prevent the male connector elements of the first and second retaining bands from passing horizontally through the interior of the neckband along their respective longitudinal axes.

2. The apparatus of claim 1 wherein the male connector elements and female connector elements are each magnetic, and interlock between the male connector elements of the first and second retention bands and the female connector elements of the third and fourth retention bands is maintained at least partially by magnetic attraction.

3. The apparatus of claim 1 wherein the type of the retention devices are selected from the group consisting of grommets, crimps, rubber tubing, and string ties.

4. The apparatus of claim 1 wherein the neckband is constructed from a material suitable for securement against a neck of a user.

5. The apparatus of claim 4 wherein the neckband includes a padded element.

6. The apparatus of claim 1 wherein at least one retention device includes a first portion for connection with a forward temple area of eyeglasses, and a second portion disposed below the first portion and interconnected with one of the retention bands.

* * * * *